(12) United States Patent
Itoh et al.

(10) Patent No.: US 8,195,032 B2
(45) Date of Patent: Jun. 5, 2012

(54) VIDEO APPARATUS AND METHOD

(75) Inventors: Masaharu Itoh, Tokyo (JP); Kenji Toyoda, Chigasaki (JP); Kazuyuki Kazami, Tokyo (JP); Norikazu Yokonuma, Tokyo (JP)

(73) Assignee: Nikon Corporation, Tokyo (JP)

( * ) Notice: Subject to any disclaimer, the term of this patent is extended or adjusted under 35 U.S.C. 154(b) by 1278 days.

(21) Appl. No.: 11/822,009

(22) Filed: Jun. 29, 2007

(65) Prior Publication Data

US 2008/0031586 A1    Feb. 7, 2008

Related U.S. Application Data

(63) Continuation of application No. 10/216,271, filed on Aug. 12, 2002, now abandoned, which is a continuation of application No. 09/803,051, filed on Mar. 12, 2001, now abandoned, which is a continuation of application No. 08/932,764, filed on Sep. 17, 1997, now abandoned.

(60) Provisional application No. 60/031,870, filed on Nov. 27, 1996.

(30) Foreign Application Priority Data

Sep. 18, 1996 (JP) .................................. 8-246448

(51) Int. Cl.
*H04N 5/93* (2006.01)
*G11B 27/00* (2006.01)
*G06F 3/00* (2006.01)

(52) U.S. Cl. ......... 386/278; 386/279; 386/281; 715/723
(58) Field of Classification Search .................. 386/278, 386/279, 281; 715/723
See application file for complete search history.

(56) References Cited

U.S. PATENT DOCUMENTS

| | | | |
|---|---|---|---|
| 5,153,730 | A | 10/1992 | Nagasaki et al. |
| 5,237,648 | A | 8/1993 | Mills et al. |
| 5,404,316 | A | 4/1995 | Klingler et al. |
| 5,440,401 | A | 8/1995 | Paruski et al. |
| 5,477,337 | A | 12/1995 | Schuler |
| 5,513,306 | A | 4/1996 | Mills et al. |
| 5,537,528 | A | 7/1996 | Takahashi et al. |
| 5,546,191 | A | 8/1996 | Hibi et al. |
| 5,706,097 | A | 1/1998 | Schelling et al. |
| 5,742,339 | A | 4/1998 | Wakul |
| 5,903,309 | A | 5/1999 | Anderson |
| 5,917,488 | A | 6/1999 | Anderson et al. |
| 5,966,122 | A | 10/1999 | Itoh |

FOREIGN PATENT DOCUMENTS

| | | |
|---|---|---|
| JP | A-4-117686 | 4/1992 |
| JP | A-8-212328 | 8/1996 |
| JP | A 09-093527 | 4/1997 |
| JP | A 10-028250 | 1/1998 |

*Primary Examiner* — Vincent Boccio
(74) *Attorney, Agent, or Firm* — Oliff & Berridge, PLC

(57) ABSTRACT

A video apparatus includes a memory in which image information denoting a moving image is recorded and a thumbnail creator that creates thumbnail information denoting thumbnails upon completion of recording of the image information in the memory. The apparatus also includes various types of user interfaces by which a user can designate frames of the moving image information for thumbnail creation.

9 Claims, 18 Drawing Sheets

FIG. 3

PUSH ON THE PART
BORDERING THE PAGE

WHEN THE CORNER OF THE PAGE HAS BEEN PULLED UP,
A NEW PAGE APPEARS FROM BELOW

PUSH THE SCROLL BUTTON

← THE ENTIRE BODY OF THE THUMBNAILS SCROLLS LEFTWARD

VIDEO APPARATUS AND METHOD

RELATED PROVISIONAL APPLICATION

This is a continuation of application Ser. No. 10/216,271, filed Aug. 12, 2002 now abandoned, which is a continuation of application Ser. No. 09/803,051, filed Mar. 12, 2001 now abandoned, which is a continuation of application Ser. No. 08/932,764 filed Sep. 17, 1997 now abandoned, which claims the benefit of Provisional Application No. 60/031,870 filed Nov. 27, 1996. The entire disclosures of the prior applications are hereby incorporated by reference in their entireties.

INCORPORATION BY REFERENCE

The disclosure of the following priority application is herein incorporated by reference: Japanese Patent Application No. 8-246448, filed Sep. 18, 1996.

BACKGROUND

This invention relates to a video apparatus that reads moving image information recorded on a recording medium, creates thumbnail image information representing a list of the contents of the image information, and displays thumbnails indicated by the thumbnail image information.

In recent years, light, small-size storage media having a large amount of memory capacity have been offered for practical use. In particular, readily attachable/detachable storage media, such as magnetooptical (MO) disks and high capacity disks such as those sold under the trademark ZIP, as well as drives that access such storage media, have become less expensive and their use is becoming widespread.

Meanwhile, a high-performance video apparatus, which is to replace an 8 mm video camera, has been developed which has high efficiency and a high degree of freedom in image editing when used with advanced information processing techniques and can respond to various demands in practical use. Such high-performance video apparatus are known as digital moving picture cameras.

FIGS. 12 and 13 show the structure of a conventional video apparatus. The output of image pick-up unit 101 (e.g., a CCD) is connected to the input of image processing converter 102. The image processing converter 102, display 103, command unit 104, recording unit 105, and main memory 106 are connected to the bus terminal of processor 108 through common bus 107. In order to simplify the explanation, it is presumed that the recording unit 105 is an IDE-type drive unit. The command unit 104 has a recording button 104a provided on the L-shaped cylindrical case of the video apparatus. The image pick-up unit 101 is provided on the tip of the L-shaped cylindrical case.

Some of the processes performed by the video apparatus are described hereafter, referring to FIG. 14. In the video apparatus with this structure, the processor 108 monitors the contact state of the recording button 104a. When the contact of the recording button 104a is closed (Yes in steps S9 and S10), then image pick-up unit 101 is driven through image processing converter 102 (step S11). The image given by the image pick-up unit 101 is read (step S12) and is recorded as a file in the storage medium (hereinafter it is assumed that a MO disk is used as the storage medium) attached to the recording unit 105, under the prescribed area management (step S13). In this context, a command given in the closed state of the contact of the recording button 104a is referred to as a "picture recording command." The process of reading the image information given by the image pick-up unit 101 in response to the command and recording it on the storage medium is referred to as a "picture recording process."

When the processor 108 receives a command to display an image (NO in step S10 and YES in step S8) represented by desired image information among the image information recorded on the storage medium (hereinafter simply referred to as a "display command", which includes an identifier of the file in which the desired image information is stored) through the command unit 104, the processor 108 stores the contents of the file in a predetermined storage area in the main memory 106. The processor 108 creates thumbnail information indicating single or plural thumbnails by analyzing the contents of the memory area based on the format of the image information (step S4) and supplies the thumbnail information to the display 103 (step S5). Then, the one or more thumbnails are displayed on the display screen of the display 103.

When the processor 108 receives an image editing command (simply referred to as "editing command") (NO in step S8, YES in step S7), it applies an editing process corresponding to the command to the image information stored in the storage area (step S6).

If the number of thumbnails which are to be displayed is too many to display on a single screen, then icons used for a page feed command or scroll command are displayed on the screen together with the thumbnails. FIGS. 15-17 illustrate possible examples of display screens and icons that could be displayed to facilitate review of many thumbnails. FIGS. 15-17 are examples and do not represent, to the present inventors' belief, prior art.

In the conventional technique described above, the thumbnail creation process does not begin until a display command or an editing command is received with regard to the file in which the image information for use in the thumbnail creation process is stored. Additionally, the thumbnail creation process is applied to all the contents in the file collectively. As the size of the (image information) file becomes large, the time taken for the thumbnail creating process becomes longer. This often causes the display process or editing process corresponding to the command to be suspended for a relatively long period of time (i.e., while the thumbnail creation process is being completed).

Furthermore, generally, the larger the size of the file, the greater the number of thumbnails, which then requires the user to search through many thumbnails in order to locate a desired frame among the thumbnails.

SUMMARY

The present invention aims to provide a video apparatus which can generate a list of the image information efficiently, while being flexibly applied to various forms of actual use.

According to one aspect of the invention, a video apparatus has a memory means in which image information representing moving images is recorded, and a thumbnail creating means that reads the image information recorded in the memory means and generates thumbnail information representing thumbnails corresponding to the moving images. The thumbnail creating means begins reading the image information and creating the thumbnails upon completion of recording of the image information into the memory means. The thumbnails can be generated in time-series order, based on the format of the image information.

When the video apparatus is a portable video recording apparatus, the video apparatus can also include an image pick-up means that optically captures the image of a subject to generate the image information, and picture recording means that records the image information generated by the image pick-up means in the memory means. The picture recording means also can determine whether or not the recording has been completed. The thumbnail creating means includes means for reading the image information recorded in the memory means when the determination result made by the picture recording means is affirmative and for creating thumbnail information based on the read image information.

Additionally, when the video apparatus includes an image pick-up means and a picture recording means, it can also include a task managing means that manages tasks (the tasks being, e.g., the picture recording process and the thumbnail creating process including reading of the image information by the thumbnail creating means) and a task start control means that monitors the start and the end point of the picture recording process through the picture recording means. The task start control means assigns starting of the thumbnail creating process a lower priority than the picture recording process.

The video apparatus also can include a user interface by which an operator designates a frame which is to be converted to a thumbnail. In such an embodiment, the picture recording means includes means for recording in the memory means a mark corresponding to the frame designated through the user interface, together with the image information. The thumbnail creating means selects, as an object of thumbnail information creation, a frame that follows in time-series order the frame corresponding to the mark recorded in the memory means by the picture recording means from among image information recorded in the memory means.

The thumbnail creating means can select, as an object of thumbnail information creation, a set of frames that correspond to an individual mark recorded in the memory means by the picture recording means, from among image information recorded in the memory means.

The video apparatus also can include a first user interface by which an operator designates a frame which is to be converted to a thumbnail. The picture recording means includes means for recording in a memory means a mark corresponding to the frame designated through the first user interface, together with the image information. The thumbnail creating means defines, as the subject for creating thumbnail information, from among image information recorded in the memory means, the frame that corresponds in time-series order to the tail end mark (i.e., the last mark) recorded into the memory means, by the picture recording means.

The video apparatus also can include display means for displaying the predetermined form of images denoted by image information recorded in the memory means. A second user interface is provided by which an operator selects a frame from among the frames displayed by the display means. The picture recording means includes a means for recording the mark corresponding to the frame designated through the first user interface, combined with the image information, into the memory means. The thumbnail creating means defines, from among the frames denoted by image information recorded in the memory means, the frame selected via the second user interface, in place of the frame corresponding to the mark recorded in the memory means by the picture recording means, as the subject for creating thumbnail information.

In the video apparatus according to one aspect of the present invention, the thumbnail creating means reads the image information recorded in the memory means and automatically specifies the lead of the moving images and creates thumbnail information denoting the thumbnail corresponding to the time-series order of images from this lead. Thus, thumbnail information is reliably created even if no identifying information for specifying the frame of the moving image denoted by the image information is provided.

As a result, as compared to conventional examples in which the thumbnail information could not be created unless identifying information is appropriately supplied by the operator, the operational and applicational efficiency are heightened.

When the video apparatus includes the image pick-up means, the picture recording means records the image information into the memory means, in conjunction with determining whether the image recording has been completed. In the event that the result of this determination is affirmative, the thumbnail creating means reads the image information recorded in the memory means and begins the process that creates thumbnail information from this image information.

In other words, the process that creates the thumbnail information begins in conjunction with the completion of picture recording. Thus, the edit process or display process can be performed efficiently compared to the conventional examples in which this kind of process had to be appropriately initiated at the time of editing or display.

When a task start control means is provided, it monitors the point in time when the picture recording means starts or terminates the picture recording process. At this point in time, the task start control means causes the thumbnail creating means to start the thumbnail creating process for reading the image information recorded in the memory means to create thumbnail information. The thumbnail creating process is assigned a lower priority than the picture recording process. Task managing means manages the picture recording process and the thumbnail creating process as separate tasks. As a result, these processes are performed in series based on the above order of priority. Thus, whenever the picture recording processing begins or ends, the process for creating thumbnail information from the image information stored in the memory means is stopped or started, respectively. As a result, when the picture recording process ends, the thumbnail generating process begins speedily, and, even when a subsequent picture recording process starts before the thumbnail generating process finishes, the generating process starts again at the point when the subsequent picture recording process ends.

When the picture recording means records a mark corresponding to the frame designated through the user interface, that mark is combined with the image information into the memory means. Also, from among the frames forming the image information, the thumbnail creating means defines the frame corresponding to the mark as the lead frame from which, along with frames that follow in time-series order, the thumbnail information is created.

Accordingly, the thumbnail information is created only for the lead frame and the following frames designated via the user interface, not for all of the image information stored in the memory means. As compared to the case where thumbnail information is created for all of the image information, the amount of processing necessary to create thumbnail information is reduced.

In order to even further reduce the processing time, the thumbnail information can be created only for the frame designated via the user interface.

As a further refinement, when the picture recording means stores plural marks corresponding to plural frames designated via the first user interface, along with the image information, in the memory means, from among these plural marks, the thumbnail creating means can create the thumbnail information only from the frame corresponding to the tail-end (last) mark occurring in time-series order. That is, from among the frames designated via the user interface, the thumbnail information is created only for the frame designated last in time-series order, not for all of the image information stored in the memory means.

BRIEF DESCRIPTION OF THE DRAWINGS

The invention will be described in conjunction with the following drawings in which like reference numerals designate like elements and wherein:

FIG. 3 is an explanatory diagram of the operation of a first embodiment of the invention.

DETAILED DESCRIPTION OF EMBODIMENTS

The present invention is applicable to a wide variety of video apparatus that process digital moving image data. It is applicable to apparatus that record and display image data, as well as to apparatus that only display (pre-recorded) data. Thus, the invention is applicable to, for example: a portable (i.e., hand-held) video apparatus (portable digital video recorder) that records image data and displays thumbnails on its own built-in display; a combined portable digital video recorder (that may or may not have a built-in display capable of displaying thumbnails) combined with a host apparatus (portable or non-portable) that displays the thumbnails; or a digital video playback apparatus (e.g., a device specifically dedicated to digital video playback or a general purpose personal computer) that receives previously recorded images (e.g., via a disk, a cable, a communications network (e.g., the World Wide Web), or a wireless link).

Typically, the moving video data is stored in a compressed state according to, e.g., the MPEG (Moving Picture Experts Group) standards. Typically, each frame (of image information) is composed of two fields (due to interlacing), each representing half of a frame, with 30 frames being stored per second (in the case of standard television). Numerous techniques can be employed to generate thumbnail images from compressed moving image data.

A target frame is selected for which a thumbnail image is to be generated. Then, sufficient information is extracted from the compressed moving image file to form a thumbnail for the target frame. Since the MPEG format operates by discarding (not storing) repetitive information (e.g., from a series of non-moving frames), and only storing information relating to changes that occur in a series of frames (e.g., a series of moving frames), a complete, still image typically cannot be produced from the compressed data of a single frame. Typically, the data from a plurality of compressed frames is required to form a still image. Once the still image is formed, a thumbnail is generated from the still image.

For example, pixels are thinned out from the created still image in accordance with the image size of the thumbnail image. When the thinned out image is inappropriate (e.g., poor image quality), the thumbnail image data can be created by performing a predetermined image interpolation process. The interpolation of the image includes conversion of the image size so as to eliminate differences in aspect ratio, and the like. The created thumbnail image is stored in the recording medium in relation to the original moving image file. The thumbnail can subsequently be displayed when desired on the display apparatus.

This is just one possible technique for creating a thumbnail from compressed moving image data. The invention is applicable to other techniques. The invention also is not limited to any particular type of moving image compression format.

Figure 2:
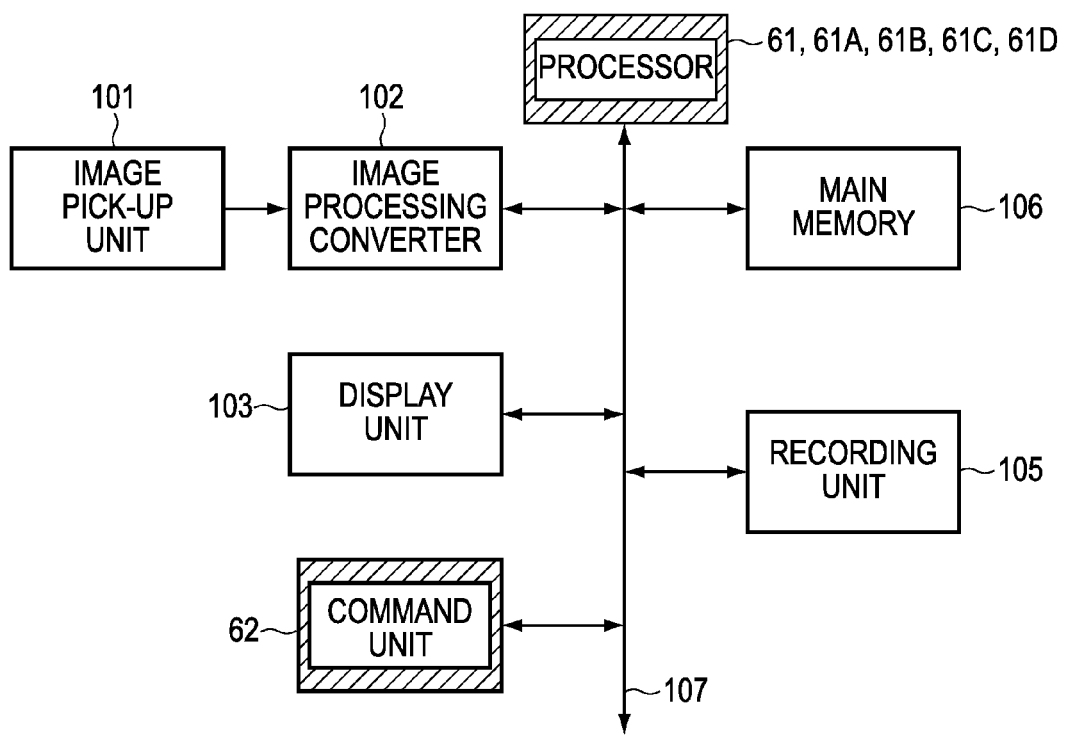
FIG. 2 is a block diagram of one preferred embodiment of the invention.
Figure 12:
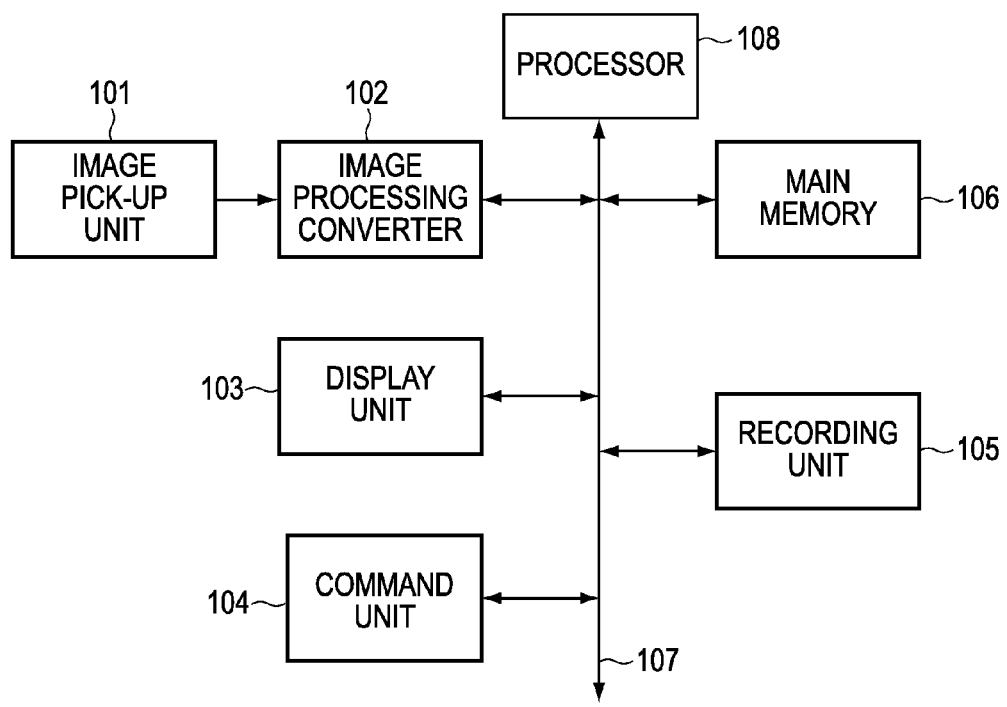
FIG. 12 is a block diagram of a conventional video apparatus.
Figure 13:
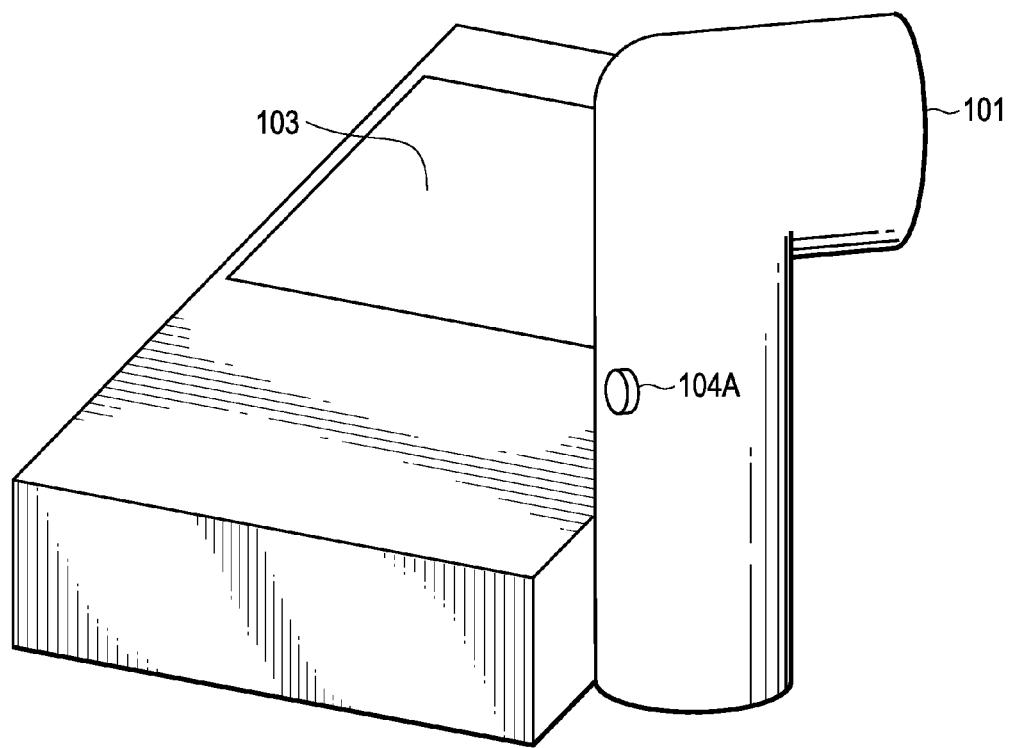
FIG. 13 is a perspective view of a conventional video apparatus.
Figure 14:
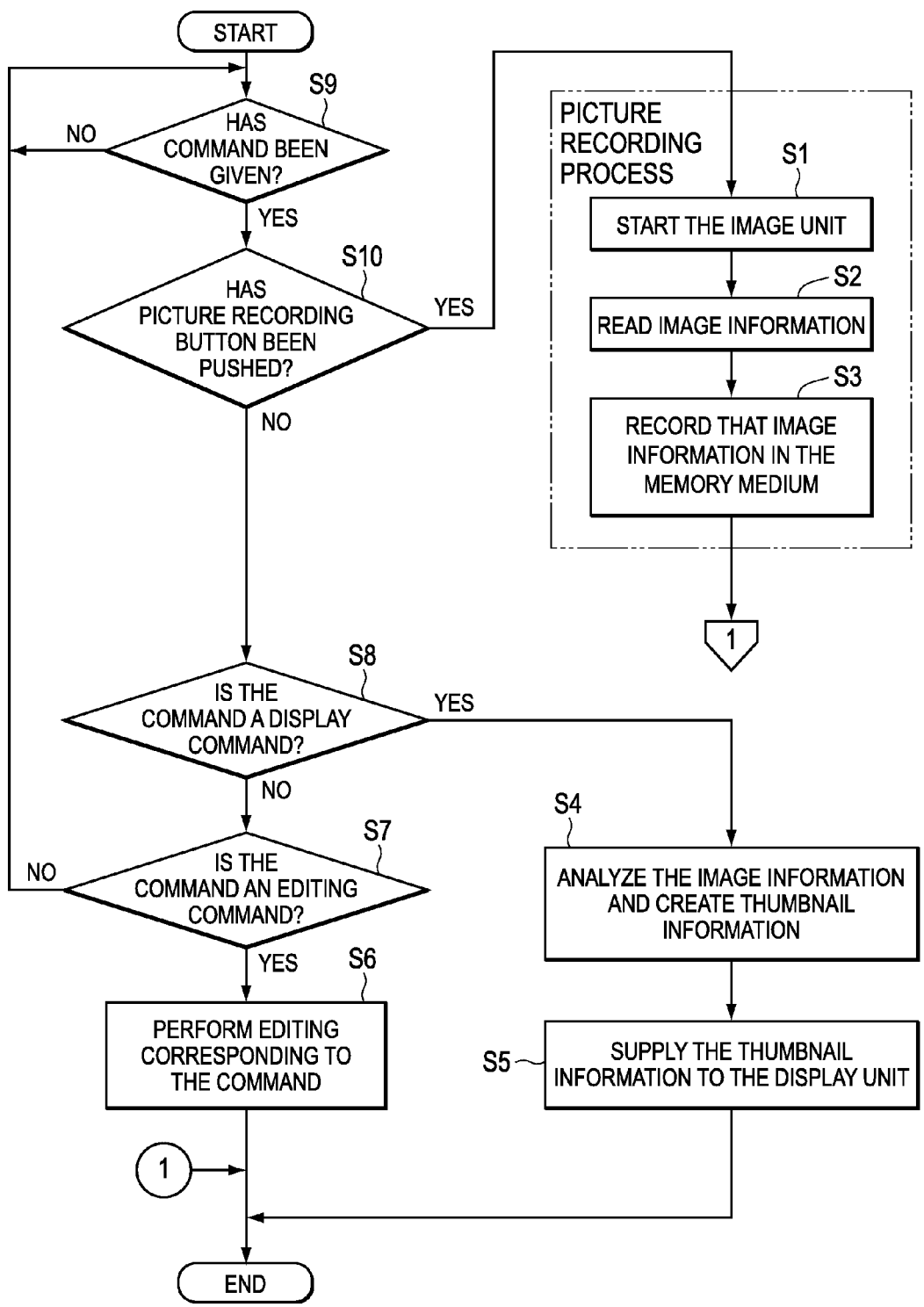
FIG. 14 is an operational flow chart of a conventional video apparatus.
Figure 15:
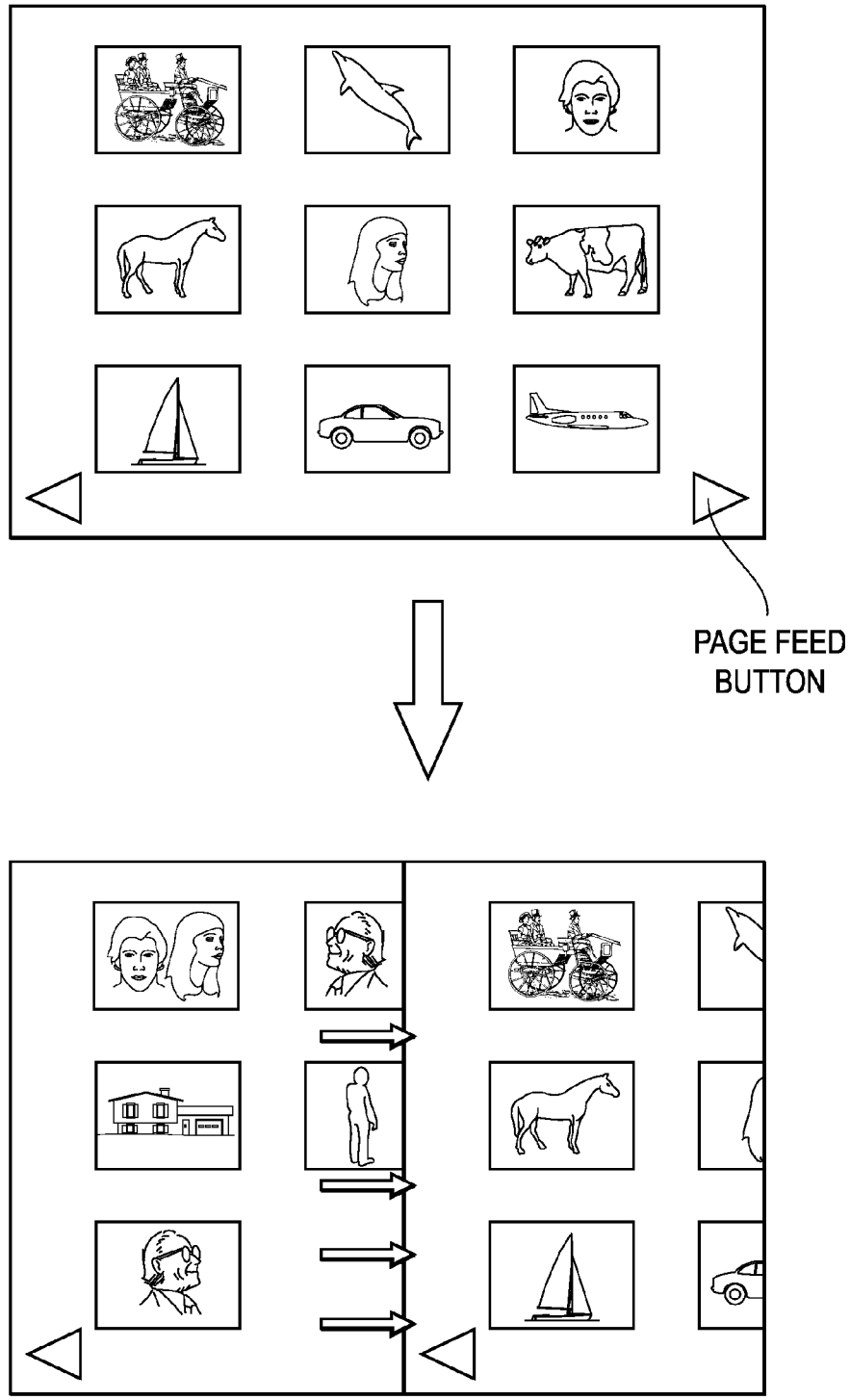
FIG. 15 shows one illustrative thumbnail display.
Figure 16:
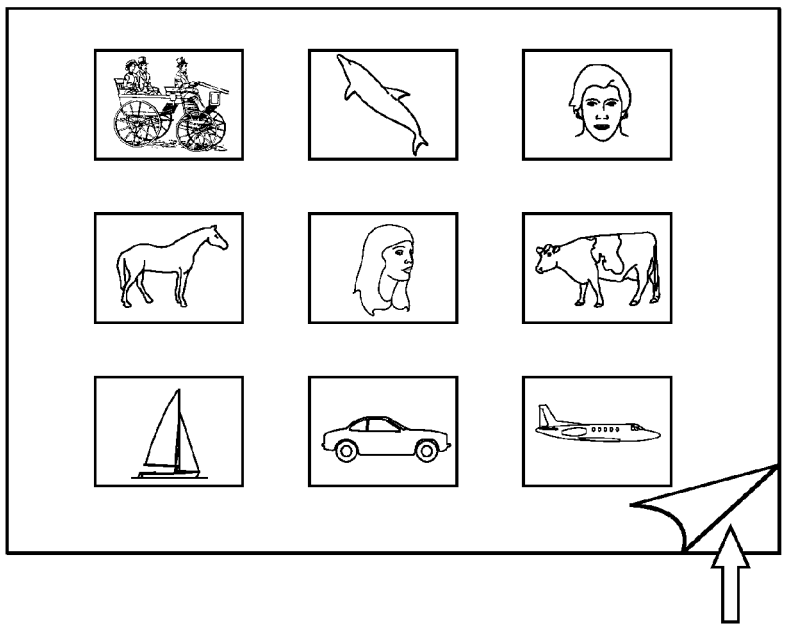
FIG. 16 shows another illustrative thumbnail display.
Figure 16:
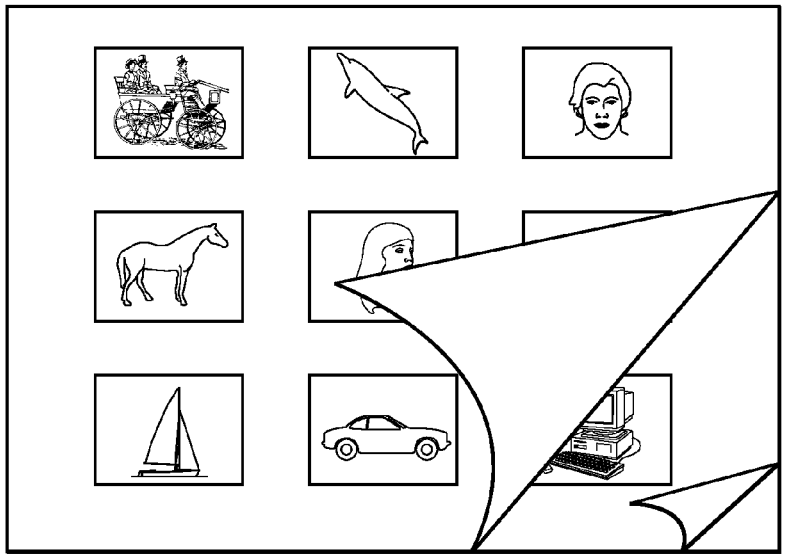
Figure 17:
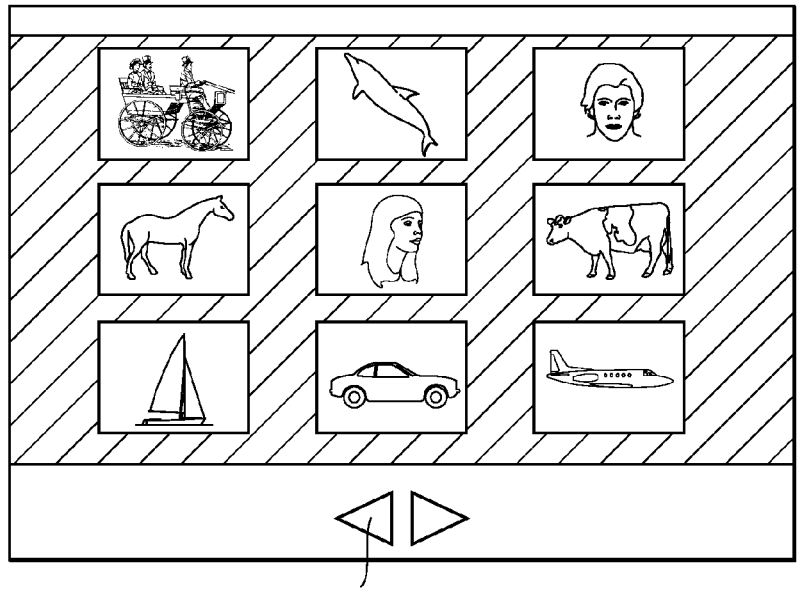
FIG. 17 shows yet another illustrative thumbnail display.
Figure 17:
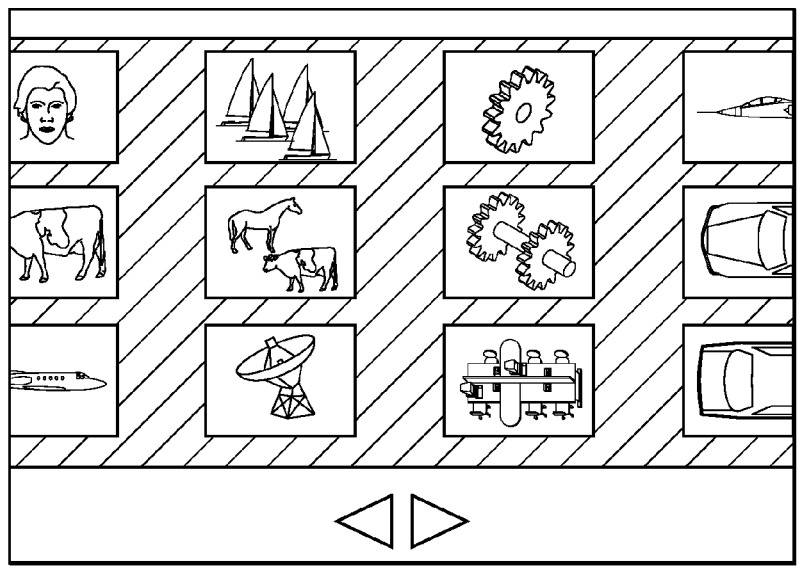
Figure 18:
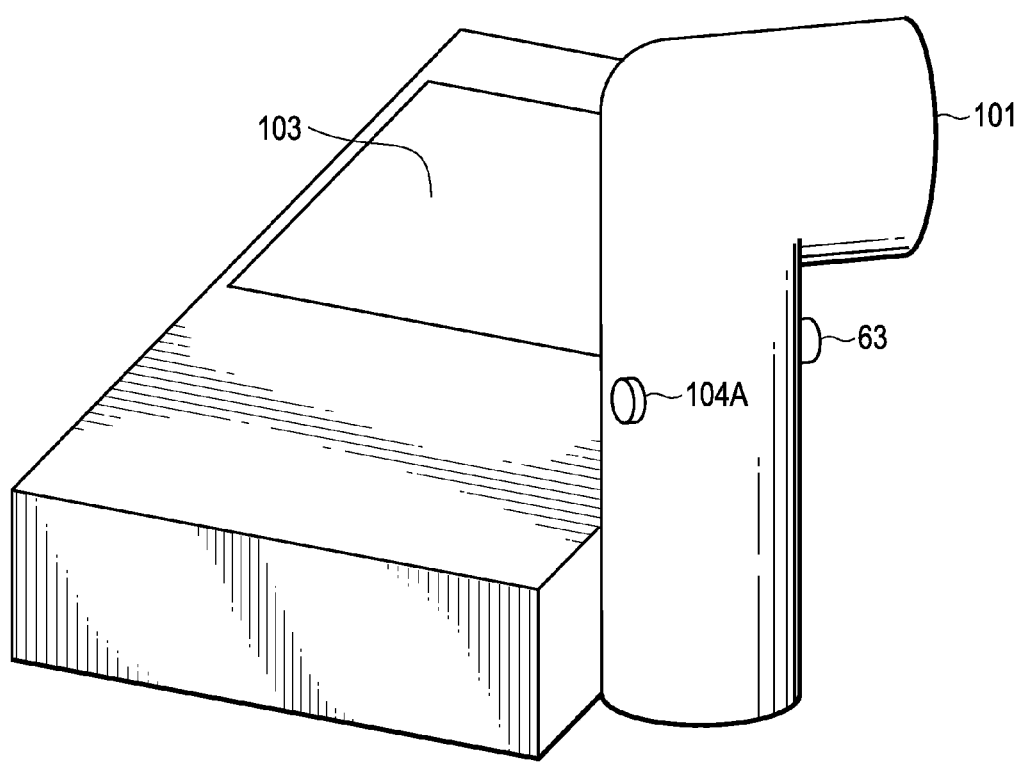
FIG. 18 is a perspective view of a video apparatus according to an embodiment of the invention.

FIG. 2 shows a preferred embodiment of the invention. In the figures, items that have the same function and composition as the items denoted in FIG. 12 are denoted by the same reference numerals, and repetitive explanation is thus omitted. Points of difference in composition between the present embodiment and the conventional apparatus shown in FIG. 12 can be seen in that the FIG. 2 embodiment includes a processor 61 in place of a processor 108 and a command unit 62 in place of a command unit 104. Further, the command unit 62 includes a thumbnail button 63, shown in FIG. 18, in addition to the picture recording button 104a. As explained below, thumbnail button 63 is one form of user interface by which a user can designate frames for thumbnail creation.

Figure 1:
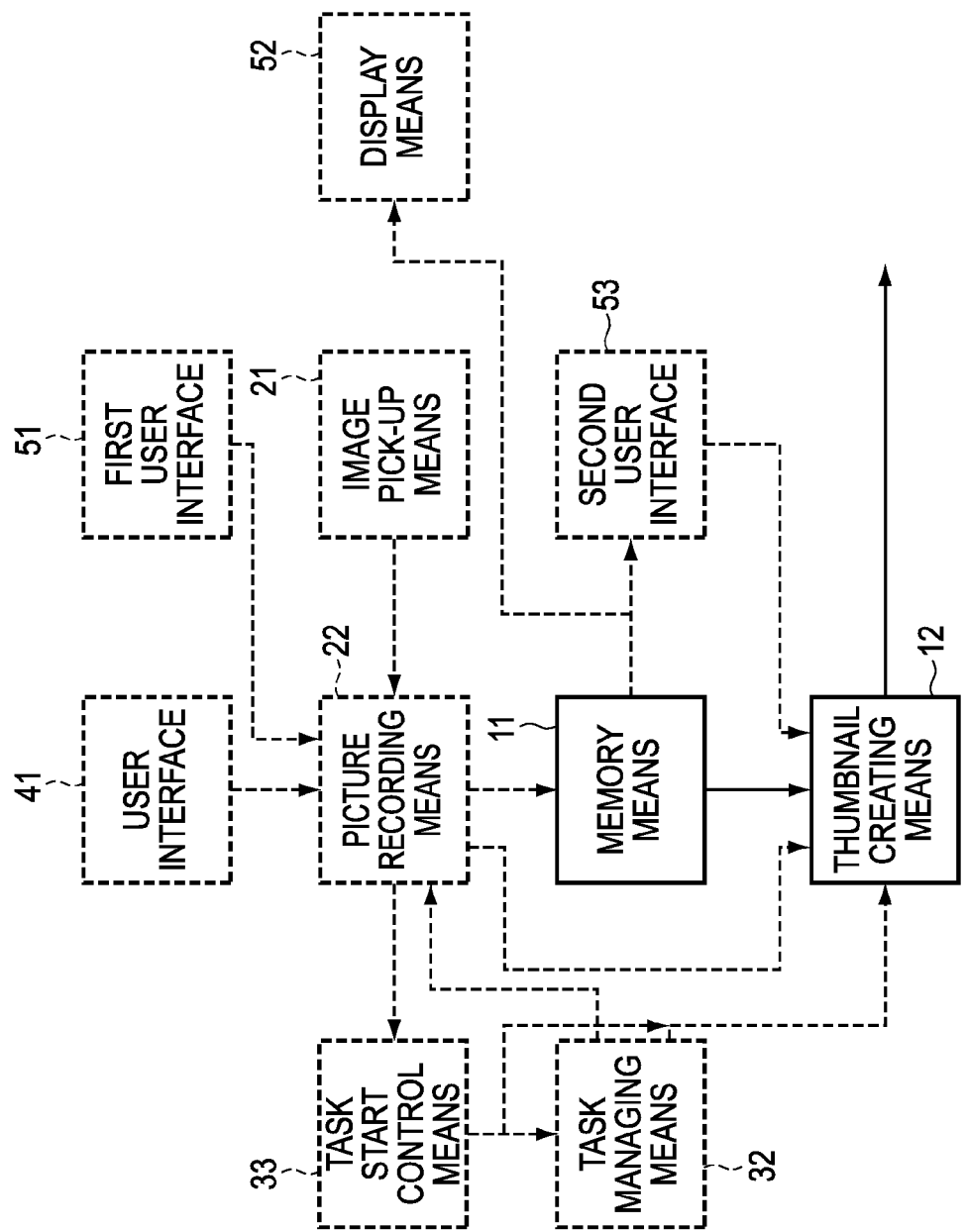
FIG. 1 is a high-level block diagram of the invention.

The relative relation between the FIG. 2 embodiment and the block diagram shown in FIG. 1 will now be provided. The recording unit 105 is part of the memory means 11. The processor 61 and the main memory 106 are parts of the thumbnail creating means 12, the task managing means 32 and the task start control means 33. The processor 61, the main memory 106, the image pick-up unit 101 and the image processing converter 102 are parts of the image pick-up means 21. Also, the processor 61, the recording unit 105 and the main memory 106 are parts of the picture recording means 22. Further, the processor 61, the main memory 106 and the command unit 62 are parts of the user interface 41, the first user interface 51 and the second user interface 53. Furthermore, the processor 61, the main memory 106 and the display unit 103 are parts of the display means 52.

Figure 3:
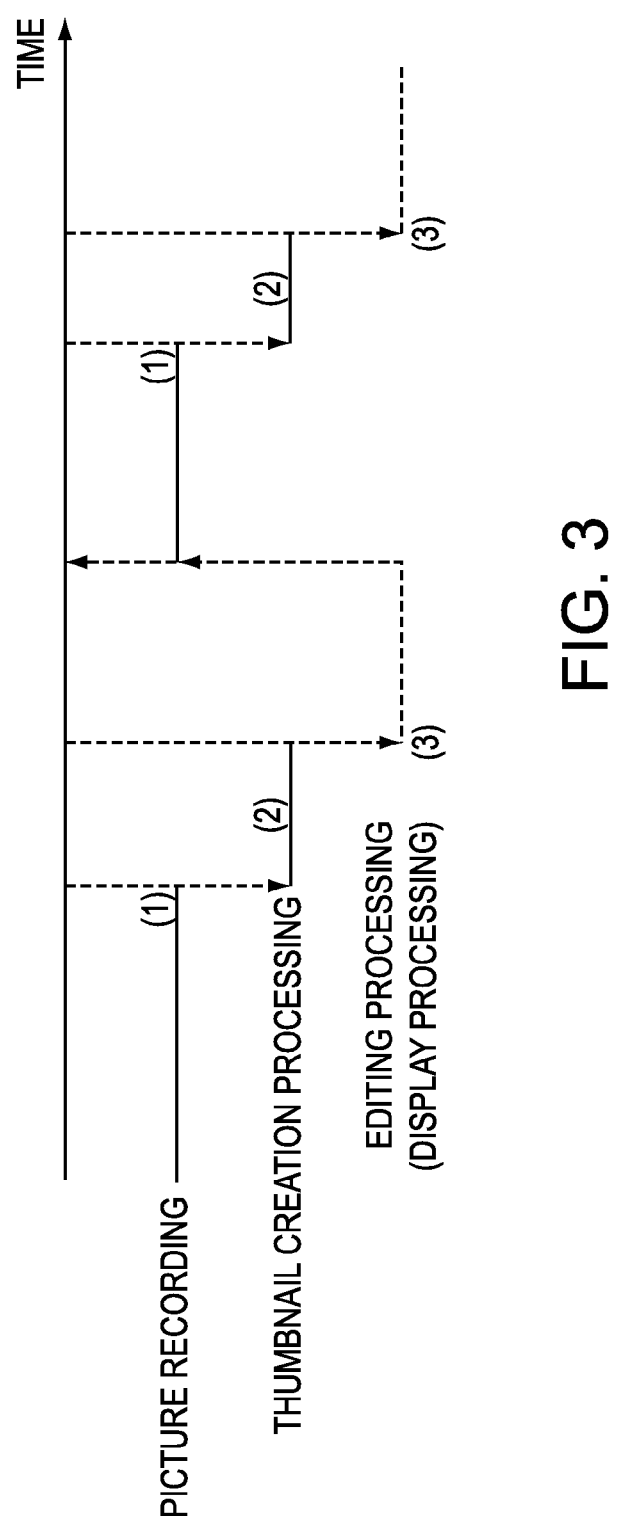
Figure 4:
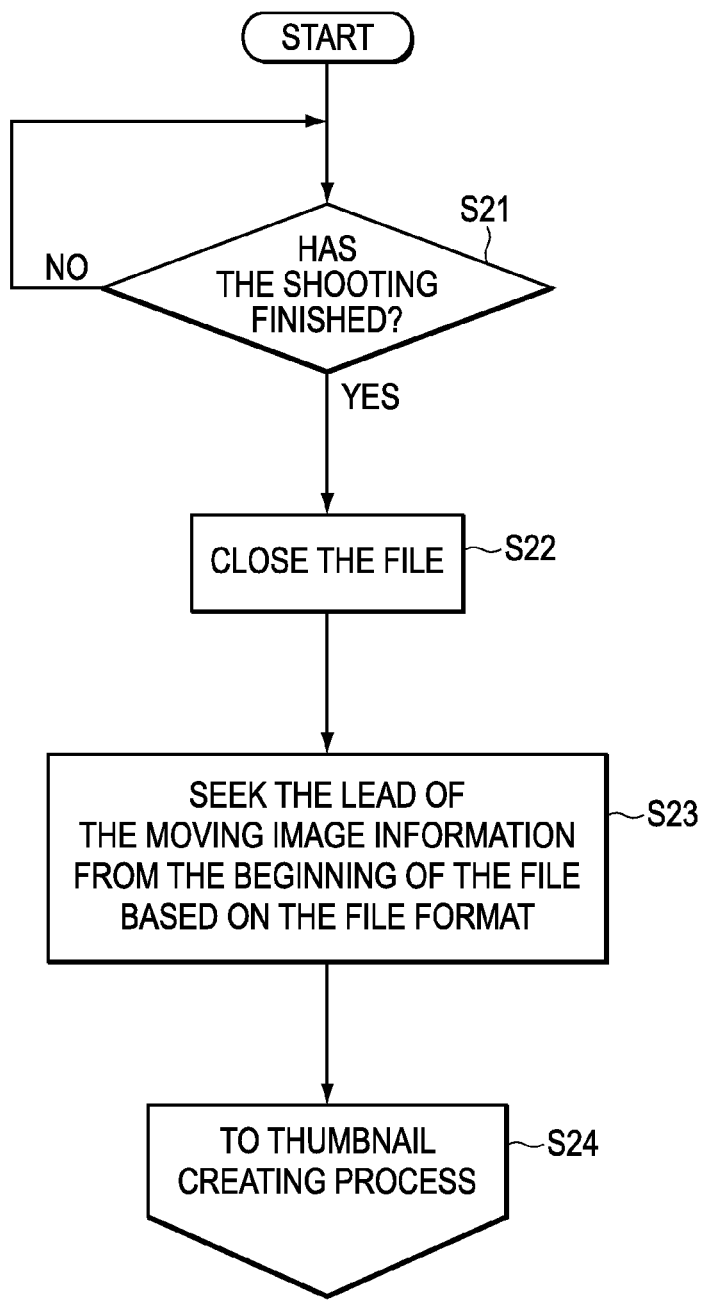
FIG. 4 is an operational flow chart of a first embodiment of the invention.

FIG. 3 explains the operation of the first embodiment of the invention. FIG. 4 is an operational flow chart of the first embodiment of the invention. The operation of the first embodiment of the invention is explained below with reference to FIGS. 2, 3, 4 and 18.

When the picture recording order is given, the processor 61, in the same way as in the conventional apparatus, drives the image pick-up unit 101 through the image processing converter 102 and reads the image information supplied by the image pick-up unit 101. Then, it records the image information as a file in the memory medium loaded into the recording unit 105.

Further, the processor 61, in the above-described picture recording process, determines whether picture shooting is finished by determining whether the contact point of the picture recording button 104*a* is open (step S21). When the result of this determination is affirmative, the process is interrupted ((1) in FIG. 3). Furthermore, the processor 61 closes the aforesaid file (step S22). From the moment that the process is interrupted in this way, the image information stored in this file is used to create thumbnail information as described below.

First, the lead of the region in which the image information representative of moving images is recorded is detected based on the file format (Step S23). Then, processing is executed on the image information stored in this region in the same way as in a conventional apparatus to create thumbnail information (this process is referred to below as the "thumbnail creating process") ((2) in FIG. 3, step S24 in FIG. 4).

In accordance with this preferred embodiment, within the image information created by picture recording performed by the command of an operator, the process of creating the thumbnail information from the moving image file is automatically performed. This process is immediately activated upon the completion of picture recording. Accordingly, the available processing time of the processor 61 is effectively utilized, and the editing and display processes ((3) in FIG. 3) associated with moving image information recorded in advance in the memory medium can be smoothly performed.

A second embodiment of the invention is explained below. The point of difference in the composition between the second embodiment and the first embodiment of the invention is that it includes a processor 61*a* in place of the processor 61.

Figure 5:
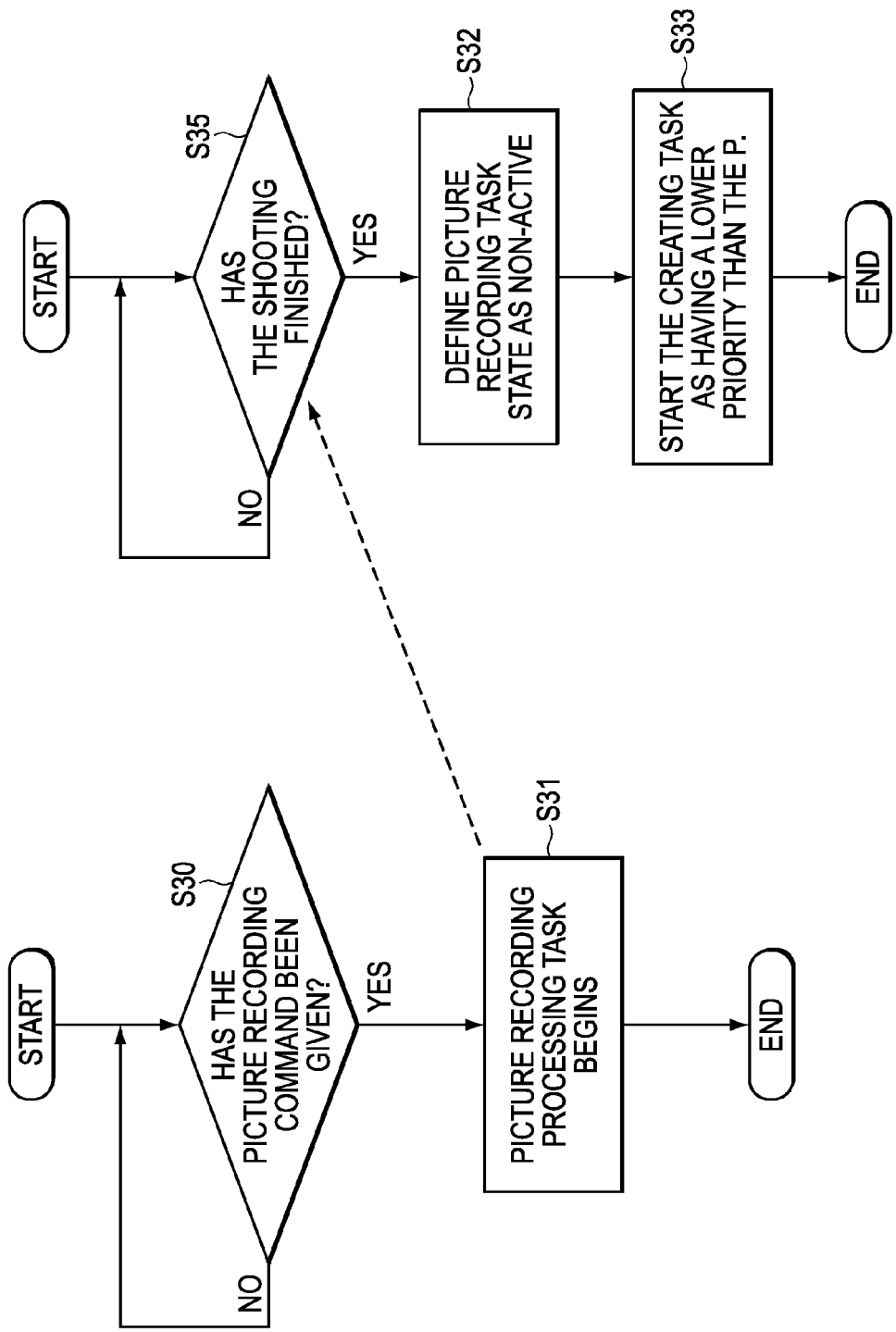
FIG. 5 is an operational flow chart of a second embodiment of the invention.
Figure 6:
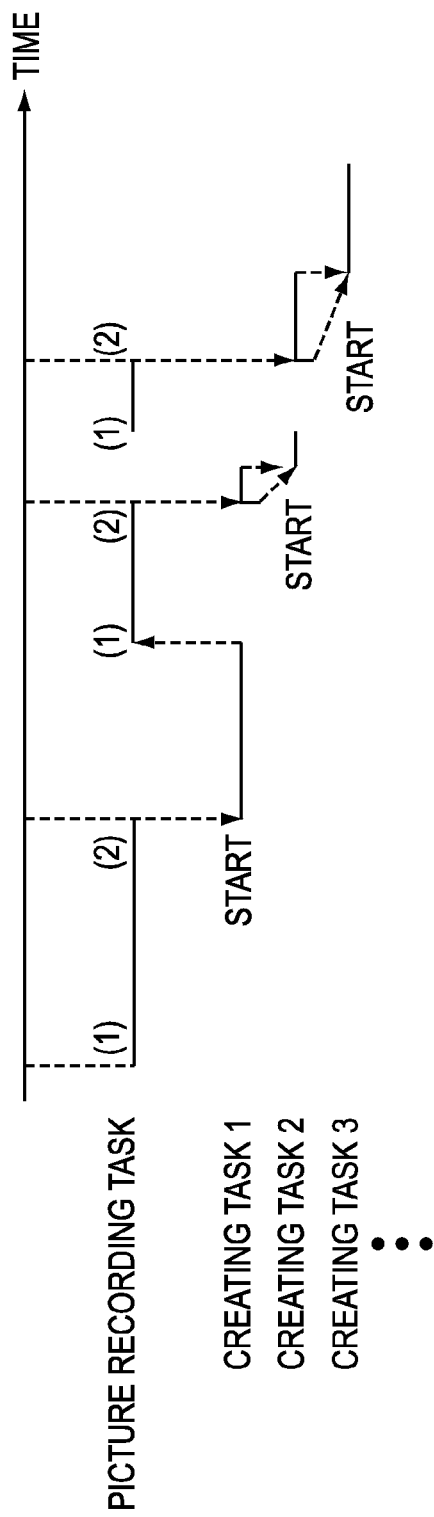
FIG. 6 is an explanatory diagram of the operation of the second embodiment of the invention.

FIG. 5 is an operational flow chart of the second embodiment of the invention. FIG. 6 is a figure explaining the operation of the second embodiment of the invention. The operation of the second embodiment is explained below with reference to FIGS. 2, 5 and 6. The above-described picture recording process, thumbnail creating process, the editing process, and the display process are defined as tasks having priorities in this order. The processor 61 *a* performs task managing for these tasks by performing the appropriate activation of each task.

Upon receiving a picture recording order (Yes in step S30), the processor 61*a*, in the same way as in a conventional apparatus, activates the picture recording process as a task (referred to below as the "picture recording task") (step S31 in FIG. 5, (1) in FIG. 6). However, when the picture recording process ends (Yes in step S35), the state of that picture recording task is made non-active (step S32) in FIG. 5, (2) in FIG. 6), and the thumbnail creating process is activated as a task (referred to below as the "creating task") (step S33) in FIG. 5).

The priority of the thumbnail creating task activated in this way is lower than the priority of the above-described picture recording task; conversely, the thumbnail creating task has a greater priority than tasks such as editing or displaying. As a result, the process of the thumbnail creating task, in the event that it is not completed by the initiating point in time of the subsequent picture recording, is continued following the termination of the process of the picture recording task. In other words, if a subsequent image recording task is initiated before an activated thumbnail generating task is completed, thumbnail creation is interrupted and made non-active, and the subsequent image recording process is performed. When the subsequent image recording process is completed, it becomes non-active, and the thumbnail creation process is resumed. Editing and displaying are not activated unless recording and thumbnail creating are non-active.

Accordingly, in the second embodiment, the processing of the processor 61*a* is more effectively utilized than in the first embodiment of the invention. Also, the time that the operator must wait, prior to performing editing and display, for the thumbnail creating process to terminate, is shortened. In addition, restrictions are eased with regard to the timing of photographic shooting.

Further, in the second embodiment, task managing is performed by the processor 61*a*. The effective and reliable performance of this kind of task managing may be achieved through the use of software which does not need to be installed in the operating system of the processor 61*a*.

A third embodiment of the invention is explained below. The point of difference in the composition of the third embodiment is that it is equipped with processor 61*b* in place of processors 61 and 61*a*.

Figure 7:
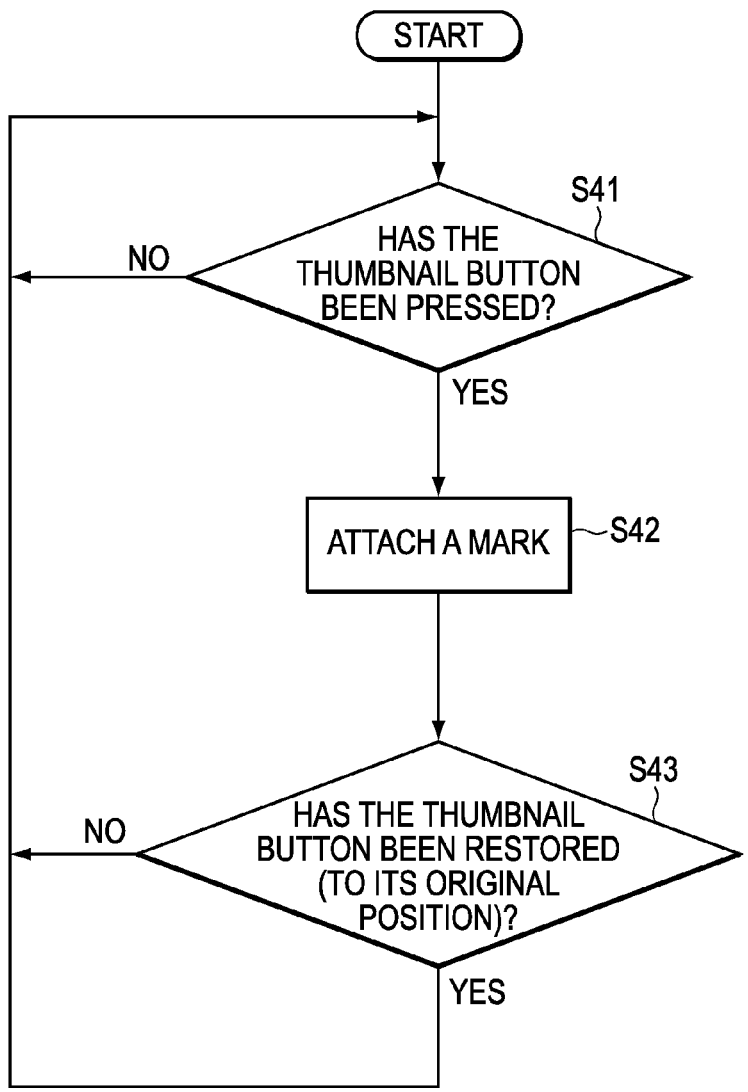
FIG. 7 is an operational flow chart of a third embodiment of the invention.

FIG. 7 is an operational flow chart of the third embodiment of the invention. The operation of the third embodiment of the invention is explained below with reference to FIG. 2 and FIG. 7.

In the picture recording process, the processor 61*b* observes with a predetermined frequency the state of the contact point of the thumbnail button 63 (step S41). At the point in time when this contact point is closed, a mark is attached to the image information of the frame obtained via the image processing converter 102 from the image pick-up unit 101 (step S42). Furthermore, in the processor 61*b*, when the process of applying the mark in this way has been completed (Yes in step S43), the order is again awaited for the contact point of the thumbnail button 63 to be set and the same process is repeated below. By this process, one or more frames are designated for thumbnail creation.

When the thumbnail creating process is activated, the processor 61*b* first specifies the portion denoting the moving image, based on the format of the image information, starting at the lead part of the image information that is the subject of this process. Then, the mark is retrieved from this section by reviewing the information in time-series order in which the picture recording was performed.

The processor 61*b*, in the event that one or more marks have been retrieved by this process, creates thumbnail information, with the subject composed only of image information denoted by the marked frame and of a suitable number of frames following the frame corresponding to this mark.

Because the frame sequence that is to be displayed by thumbnails is reliably selected based on the plan of the photographer, as compared to the first and second embodiments of the invention, the efficiency of the thumbnail creating process is further heightened.

Further, the mark need not be incorporated in the image information. It may be stored elsewhere in available regions in the memory medium and associated with the frame (e.g., by pointers or by having similar header information).

In the third embodiment, a series of frames following the mark applied to each cut (in the contact state of thumbnail button 63) is made the subject of a thumbnail creating process. However, the present invention is not limited to this kind of composition. For example, if the frames in which the mark is applied during picture recording, or the frames recorded preceding or following these frames in time series order, become the subject of the thumbnail creating process, then the efficiency of the process is heightened.

A fourth embodiment of the invention is explained below. The point of difference in the composition, between the fourth embodiment and the previous embodiments of the invention, is that it is equipped with a processor 61*c*, in place of the processors 61, 61*a*, or 61*b*.

Figure 8:
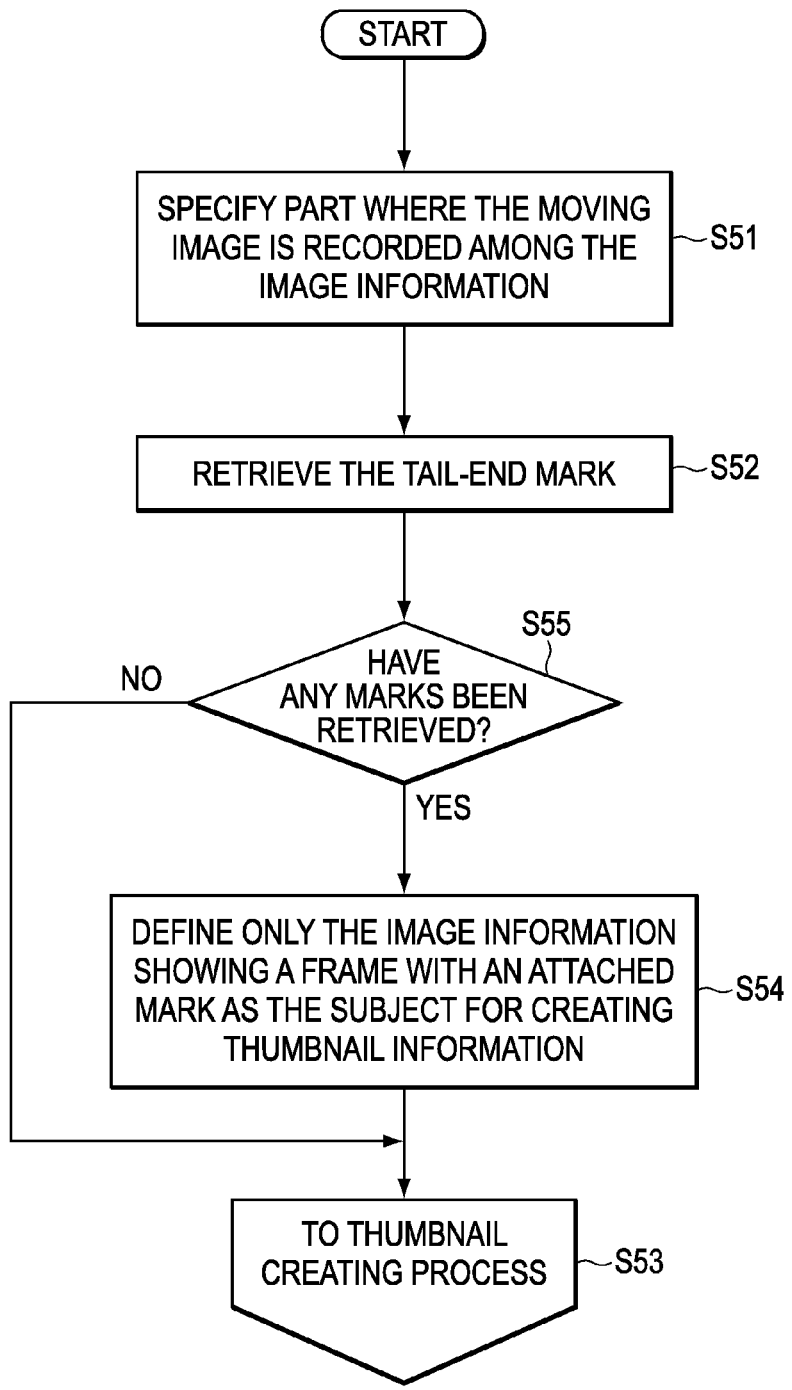
FIG. 8 is an operational flow chart of a fourth embodiment of the invention.

FIG. 8 is an operational flow chart of the fourth embodiment of the invention. The operation of the fourth embodiment of the invention is explained with reference to FIG. 2 and FIG. 8.

In the same way in the fourth embodiment as in the third embodiment of the invention, in the picture recording process, the processor 61*c* observes with a predetermined frequency the state of the contact point of the thumbnail button 63. At the moment when the contact point is closed, a mark is attached to the image information of the frame obtained via the image processing converter 102, from the image pick-up unit 101.

However, when the thumbnail creating process is activated, the processor 61*c* first specifies the portion of the moving image (based on the format of the image information) from the leading part of the image information that is the subject of the processing (step S51). The processor 61*c* then retrieves, from that portion, the tail-end mark in the time-series order performed by the picture recording (step S52) (i.e., the last mark designated by the user).

If a mark is not retrieved (NO in step S55), within the retrieval process performed in this way, the processor 61*c*, in the same way as in the first and second embodiments of the invention, performs the thumbnail information creating process (step S53). However, if, conversely, a mark has been retrieved (Yes in step S55), thumbnail information creation will be performed, with the subject being only the image information of the frame in which the tail-end mark is attached (step S54).

Even if, based on the plan of the photographer, the frame that is to be displayed as thumbnails for each picture-recorded cut is changed, the thumbnail information of the frame suitably corresponding to the result of this alteration is reliably created. As a result, convenience of application and the efficiency of the thumbnail creating process is heightened.

Further, in the fourth embodiment, the format of the image information and the process applied in order to retrieve the tail-end mark in each cut is not important. However, as long as the storage medium is random-accessible, a practical response characteristic can be ensured. For example, the previously set marks may be successively deleted and replaced as subsequent marks, or an individual mark may be stored as a sequence of identification numbers representing the frames.

With regard to this kind of mark, in the event that retrieval processing is performed, with regard to the several cuts, either in series or in parallel, for example, the identifier of the cut, or the time when picture recording was performed, may also be included.

Furthermore, in the third and fourth embodiments of the invention, a mark is attached to the frame designated by the operator during the picture recording process (using thumbnail button 63). However, the present invention is not limited to this kind of picture recording processing. For example, with regard to display processing, performed in the same way as in conventional apparatus corresponding to the display order (designation), as denoted in FIG. 9, a slide bar 201 supplied for turning the page of the moving image, and a selection button 202 supplied for setting the mark, may be displayed on the display screen of the display unit 103 by the processor 61*c*. When the selection button 202, operated in combination with the slide bar 201, is clicked (actuated), the mark is attached to the corresponding frame and processing may be performed associated with renewal of the mark. Thus, the mark can be applied (to designate frames for thumbnail creation) after original image recording.

A fifth embodiment of the invention is explained below. The point of difference in composition between the fifth embodiment and the fourth embodiment of the invention, is that it is equipped with a processor 61*d* in place of a processor 61*c*.

Figure 9:
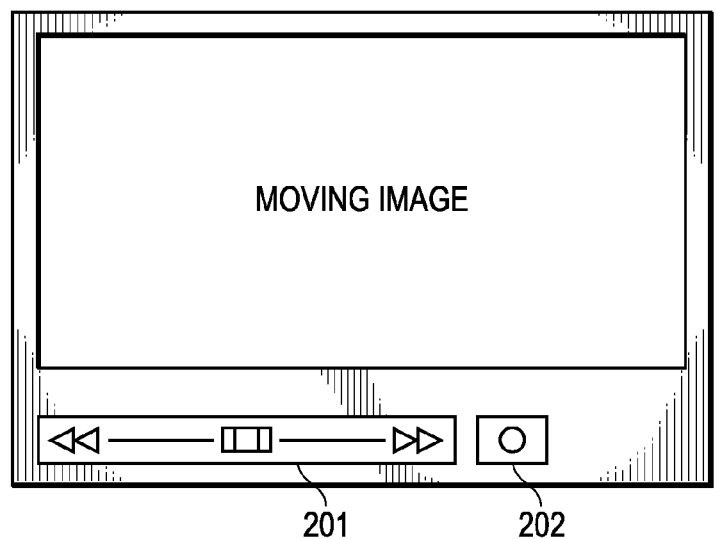
FIG. 9 shows the format of the display for the adding of renewed marks.
Figure 10:
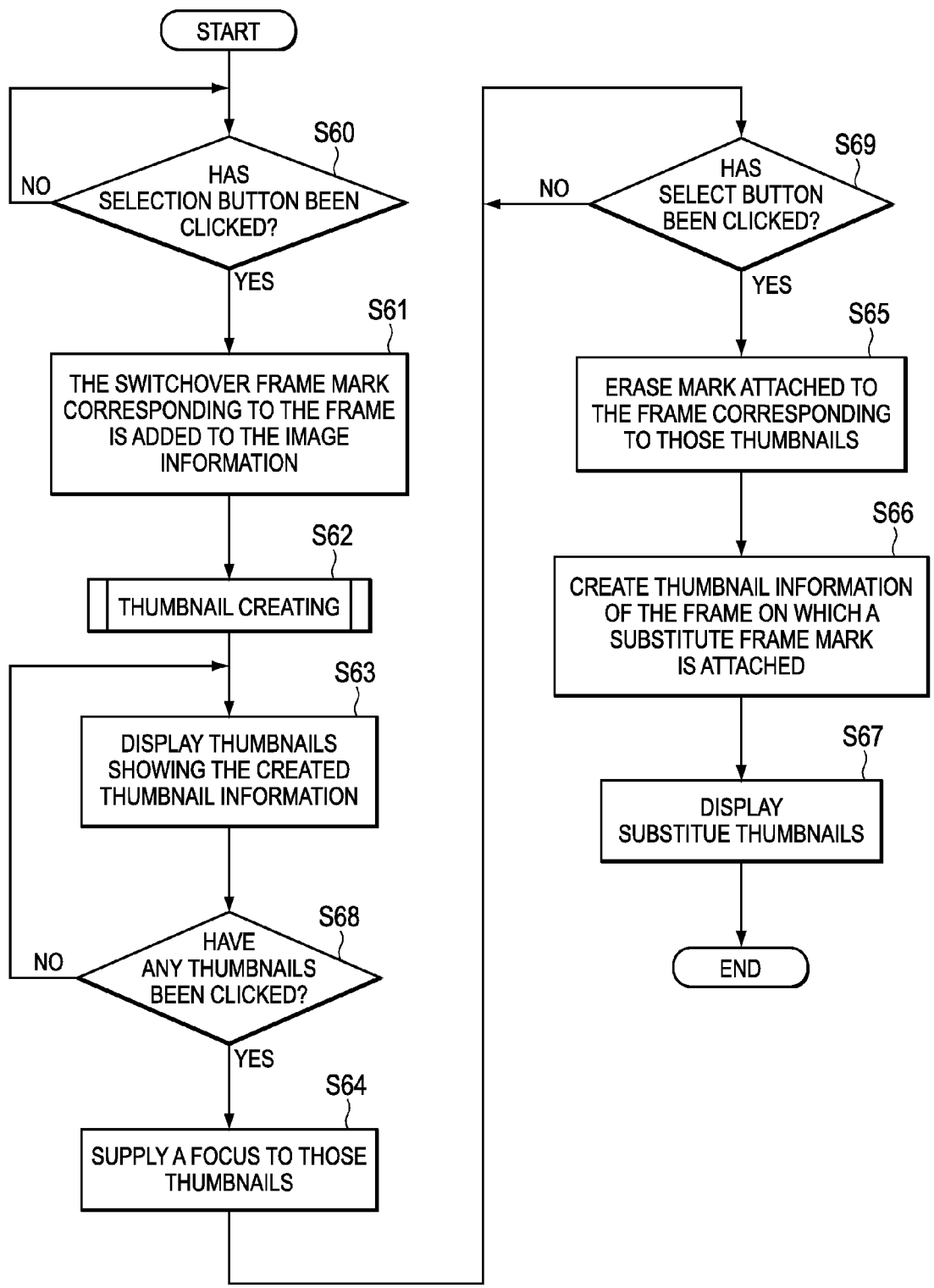
FIG. 10 is an operational flow chart of a fifth embodiment of the invention.

FIG. 10 is an operational flow chart of the fifth embodiment of the invention. The operation of the fifth embodiment of the invention is explained below with reference to FIGS. 2, 9 and 10.

The processor 61*d*, in the same way as in the fourth embodiment of the invention, displays the moving image denoting the image information recorded as a file, in the format denoted in FIG. 9, on the display screen surface of the display unit 103. Further, when the selection button 202 displayed on this display screen surface is clicked (Yes in step S60), the processor 61*d* adds a mark (referred to below as the "frame switch mark"), corresponding to the frame, to the above-described image information (step S61).

Figure 11:
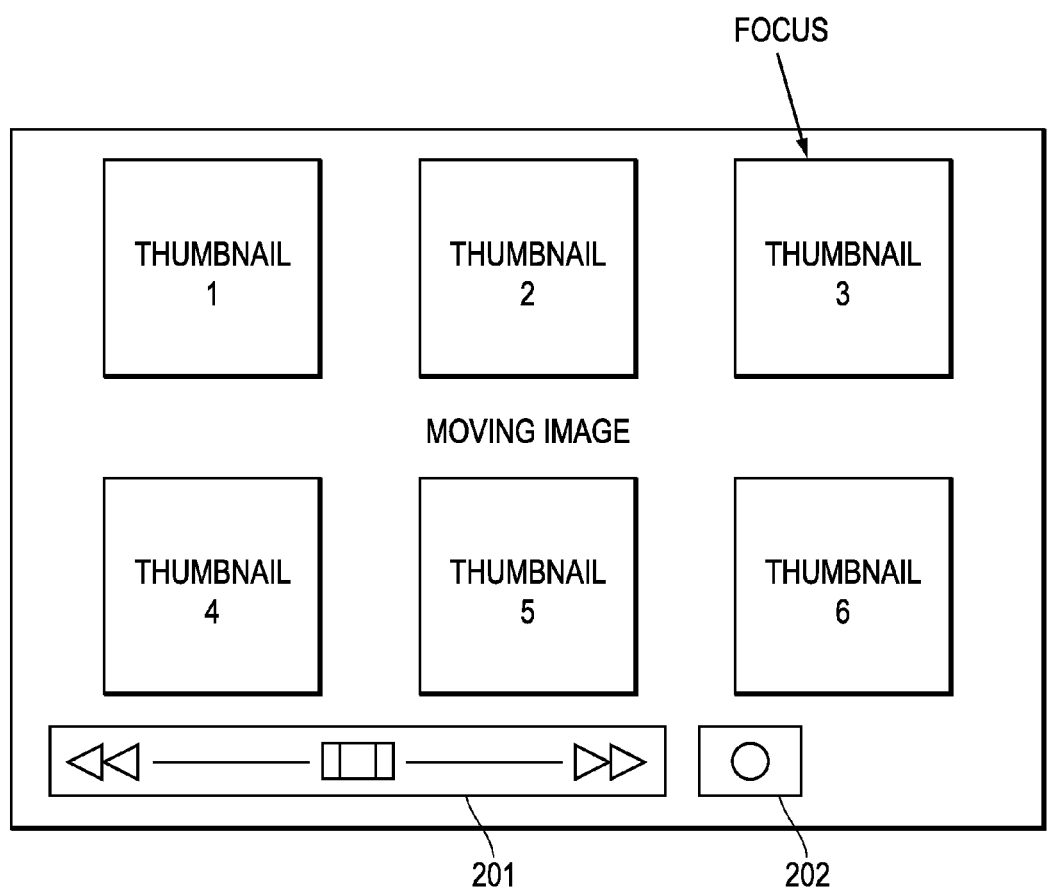
FIG. 11 shows one possible format of the thumbnails displayed on a display.

Further, in conjunction with creating thumbnail information in the same way as in the first four embodiments (step S62), the processor 61*d* displays thumbnail information denoted as thumbnails, in a format in which the slide bar 201 and selection button 202 have been added, as shown in FIG. 11 (step S63).

Furthermore, corresponding to the operation of the slide bar 201, the processor 61*d* switches over the thumbnails that have been the subject of the display, and, when one of these thumbnails has been clicked (Yes in step S68), supplies a focus to that thumbnail (step S64).

When the selection button 202 is clicked while a focus is supplied to a thumbnail in this way (Yes in step S69), the processor 61*d* refers to the associated information, deletes the mark attached to the frame corresponding to that thumbnail (step S65) and creates thumbnail information for the frame to which the above-described replaced frame mark has been attached (step S66).

The processor 61*d* displays the thumbnail indicated by this thumbnail information as a replaced thumbnail in place of the thumbnail from which the mark has been deleted (step S67).

Accordingly, in the fifth embodiment, the replaced frame is reliably set in a display process, for the frame determined by the operator to be displayed as thumbnails in the picture recording process.

In each of the aforesaid embodiments, the image information is recorded as a file in the memory medium. However, the present invention is not limited to this kind of file, and the image information may be stored as a database having a predetermined format. Furthermore, although a single thumbnail was created for each cut in the embodiments, a plurality of thumbnails may be created with regard to any one of the cuts.

Furthermore, in each of the above-described embodiments, image information is not displayed in the display unit 103, as long as it is not particularly needed. However, this invention is not limited to this composition. For example, a frame used for picture recording may be displayed in real time simultaneously with the picture recording. Any information having any format or content may also be displayed.

In the above-described first embodiment of the invention, efficiency in operation and application have been heightened, as compared to conventional apparatus. Further, image editing or display is efficiently performed, as compared to a conventional example in which the process of creating the thumbnail information is performed only upon initiation of image editing or display.

Furthermore, in the second embodiment of the invention, even if a subsequent picture recording process is commenced before the thumbnail information creating process is completed, the process of creating the thumbnail information continues reliably from the moment that the subsequent picture recording process has ended.

Further, in the third embodiment of the invention, as compared to a case in which all of the image information stored in the memory is the subject for the creation of thumbnail information, the amount of processing necessary to create thumbnail information is reduced.

In the fourth embodiment of the invention, as compared to the third embodiment, the amount of processing necessary to create thumbnail information is reduced and flexibility is improved in the operation associated with the selection of the frame to be the subject of the creation of thumbnail information.

In the fifth embodiment of the invention, there is improved flexibility in selection of the thumbnails to be the subject of display or editing.

Accordingly, in the picture recording, playback, editing processing, and the like, applied to a video apparatus of the present invention, restrictions associated with the order or timing of operation are largely mitigated and the operation environment is improved.

Furthermore, as a result of the increase of surplus processing time, the ability to achieve new added value has been heightened without changing the hardware structure.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A digital image data recording and reproducing apparatus comprising:
   a random accessible memory medium;
   a recording unit which accesses the random accessible memory medium to: (i) record on the memory medium a plurality of moving digital image data each of which indicates a moving image and information about a plurality of still digital image data each of which represents a corresponding one of moving image data, and (ii) reproduce the moving digital image data to display the moving image corresponding to the moving digital image data, the recording unit recording the information on the random accessible memory medium when the moving digital image data corresponding to the still digital image data indicated by the information is recorded on the random accessible memory medium without reproducing the moving digital image data; and
   a processor electrically connected to the recording unit, the processor having (a) a first mode for simultaneously displaying the plurality of still digital image data from the random accessible memory medium on a display unit, and (b) a second mode for displaying the moving digital image data from the random accessible memory medium on the display unit in order to allow a user to change a frame from the moving digital image data that is used to produce the still digital image data, the frame used to produce the still digital image data for the second mode being selectively changed, based on input received from a user, without changing the moving image of the moving digital image data in the random accessible memory medium when moving digital image data is reproduced from the random accessible memory medium in the second mode so that a first moving digital image data that is represented by a first still image data remains unchanged after a frame used to produce the first still image data is selectively changed, the image data from a frame selected in the second mode being displayed as the still digital image data in the first mode, and one of the first mode and the second mode can be selected.

2. A digital image data recording and reproducing apparatus according to claim 1, wherein in the second mode the processor produces to the display unit digital image data which represents the moving digital image data and a slide bar so that the display unit displays the moving digital image data and the slide bar simultaneously.

3. A digital image data recording and reproducing apparatus according to claim 2, wherein the slide bar represents a status of the moving digital image data.

4. The digital image data recording and reproducing apparatus according to claim 1, wherein the at least one mark is generated, when the moving digital image data is recorded, and the plurality of still digital image data is displayed based on the generated at least one mark.

5. A digital image data recording and reproducing apparatus comprising:
   random accessible memory means;
   recording means for (i) recording on the memory means a plurality of moving digital image data each of which indicates a moving image and information about a plurality of still digital image data each of which represents a corresponding one of moving image data, and (ii) reproducing the moving digital image data to display the moving image corresponding to the moving digital image data, recording the information on the random accessible memory means when the moving digital image data corresponding to the still digital image data indicated by the information is recorded on the random accessible memory means without reproducing the moving digital image data; and
   processing means having (a) a first mode for simultaneously displaying the plurality of still digital image data from the random accessible memory means on a display means and (b) a second mode for displaying the moving digital image data from the random accessible memory means on the display means in order to allow a user to change a frame from the moving digital image data that is used to produce the still digital image data, the frame used to produce the still digital image data for the second mode being selectively changed, based on input received from a user, without changing the moving image of the moving digital image data in the random accessible memory means when moving digital image data is reproduced from the random accessible memory means in the second mode so that a first moving digital image data that is represented by a first still image data remains unchanged after a frame used to produce the first still image data is selectively changed, the image data from a frame selected in the second mode being displayed as the still digital image data in the first mode, and one of the first mode and the second mode can be selected.

6. A digital image data recording and reproducing apparatus according to claim 5, wherein in the second mode the processing means produces to the display means digital image data which represents the moving digital image data and a slide bar so that the display means displays the moving digital image data and the slide bar simultaneously.

7. A digital image data recording and reproducing apparatus according to claim 6, wherein the slide bar represents a status of the moving digital image data.

8. A digital image data recording and reproducing apparatus, comprising:
   a random accessible memory medium;
   a recording unit which accesses the random accessible memory medium to: (i) record on the memory medium a plurality of moving digital image data each of which indicates a moving image and information about a plurality of still digital image data each of which represents a corresponding one of moving image data and (ii) reproduce the moving digital image data to display the moving image corresponding to the moving digital image data, the recording unit recording the information on the random accessible memory medium when the moving digital image data corresponding to the still digital image data indicated by the information is recorded on the random accessible memory medium without reproducing the moving digital image data; and
   a processor electrically connected to the recording unit, the processor having (a) a first mode for simultaneously displaying the plurality of still digital image data from the random accessible memory medium on a display unit and (b) a second mode for displaying the moving digital image data from the random accessible memory medium on the display unit in order to allow a user to change a frame from the moving digital image data that is used to produce the still digital image data, the frame used to produce the still digital image data for the second mode being selectively changed, based on input received from a user, without changing the moving image of the moving digital image data in the random accessible memory medium when moving digital image data is reproduced from the random accessible memory medium in the second mode so that a first moving digital image data that is represented by a first still image data remains unchanged after a frame used to produce the first still image data is selectively changed, the image data from a frame selected in the second mode being displayed as the still digital image data in the first mode, and one of the first mode and the second mode can be selected,
   wherein each of the plurality of still digital image data is formed from a plurality of compressed frames of the moving digital image data.

9. A method for controlling digital image data recording and reproducing apparatus including a random accessible memory medium comprising the steps of:
   recording on the memory medium a plurality of moving digital image data each of which indicates a moving image and information about a plurality of still digital image data each of which represents a corresponding one of moving image data so that the information is recorded on the random accessible memory medium when the moving digital image data corresponding to the still digital image data indicated by the information is recorded on the random accessible memory medium without reproducing the moving digital image data; and
   selecting (a) a first mode for simultaneously displaying the plurality of still digital image data from the random accessible memory medium on a display unit, and (b) a second mode for displaying the moving digital image data from the random accessible memory medium on the display unit in order to allow a user to change a frame from the moving digital image data that is used to produce the still digital image data, the frame used to produce the still digital image data for the second mode being selectively changed, based on input received from a user, without changing the moving image of the moving digital image data in the random accessible memory medium when moving digital image data is reproduced from the random accessible memory medium in the second mode so that a first moving digital image data that is represented by a first still image data remains unchanged after a frame used to produce the first still image data is selectively changed, the image data from a frame selected in the second mode being displayed as the still digital image data in the first mode, and one of the first mode and the second mode can be selected.

* * * * *